(12) United States Patent
Uramachi et al.

(10) Patent No.: US 7,293,457 B2
(45) Date of Patent: Nov. 13, 2007

(54) MEASURING APPARATUS FOR MEASURING FLOW RATE OF A FLUID

(75) Inventors: Hiroyuki Uramachi, Tokyo (JP); Ryouichi Sasahara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 37 days.

(21) Appl. No.: 11/208,725

(22) Filed: Aug. 23, 2005

(65) Prior Publication Data

US 2006/0112763 A1 Jun. 1, 2006

(30) Foreign Application Priority Data

Nov. 30, 2004 (JP) ............................ 2004-345745

(51) Int. Cl.
*G01F 1/68* (2006.01)
(52) U.S. Cl. ................................... 73/204.22
(58) Field of Classification Search ..................... None
See application file for complete search history.

(56) References Cited

U.S. PATENT DOCUMENTS 6,640,627 B2 * 11/2003 Sato et al. ............... 73/204.22
6,666,082 B2 * 12/2003 Watanabe et al. ........ 73/204.22
6,708,560 B2 * 3/2004 Watanabe et al. ........ 73/204.22

FOREIGN PATENT DOCUMENTS

| JP | 08-297040 A | 11/1996 |
| JP | 09-00487 B2 | 1/1997 |
| JP | 11-014423 A | 1/1999 |
| JP | 2000-002572 A | 1/2000 |
| JP | 2001-012987 A | 1/2001 |
| JP | 2001-311637 A | 11/2001 |
| JP | 2002-181602 A | 6/2002 |

* cited by examiner

*Primary Examiner*—Harshad Patel
(74) *Attorney, Agent, or Firm*—Sughrue Mion, Pllc.

(57) ABSTRACT

A metal plate is supported by a base, and is disposed inside a main passage so as to be generally parallel to a direction of flow of a fluid being measured through the main passage, and a circuit board and a flow rate detecting element are disposed so as to be positioned generally in a common plane with a front surface of the metal plate. A circuit housing portion formed integrally on the base is disposed on the front surface of the metal plate so as to surround the circuit board, an electrical connection portion between the circuit board and the flow rate detecting element, and an electrical connection portion between the circuit board and a connector portion. A measuring passage groove forming portion formed integrally on the base is disposed on the front surface of the metal plate, and functions together with the metal plate to constitute a measuring passage. In addition, the circuit housing portion is charged with a sealing gel, and a cover is mounted so as to cover the circuit housing portion.

13 Claims, 9 Drawing Sheets

MEASURING APPARATUS FOR MEASURING FLOW RATE OF A FLUID

BACKGROUND OF THE INVENTION

1. Field of the Invention

The present invention relates to a flow rate measuring apparatus for measuring a flow rate of a fluid, and particularly to a flow rate measuring apparatus suitable for measuring the flow rate of intake air sucked into an internal combustion engine of an automobile.

2. Description of the Related Art

Conventional flow rate measuring apparatuses are configured by mounting a mold in which a half cross-section of an auxiliary air passage is formed to a modular housing in which a half cross-section of the auxiliary air passage is formed. The half cross-section of the auxiliary air passage of the modular housing and the half cross-section of the auxiliary air passage of the mold function together to constitute an auxiliary air passage. The modular housing is formed by fixing an L-shaped metal base, terminals, and a lead frame by plastic molding. At that time, a circuit board housing portion, a connector, and the half cross-section of the auxiliary air passage are formed in the modular housing simultaneously. The circuit board is fixed onto the metal base inside the circuit board housing portion, and the terminals, the lead frame, and the circuit board are electrically connected. In addition, a heating coil functioning as a flow rate detecting element has a first end connected to the lead frame and is disposed so as to extend inside the auxiliary air passage. These conventional flow rate measuring apparatuses are inserted such that the auxiliary air passage is positioned inside a main air passage, and are mounted by screwing the metal base onto the main air passage. (See Patent Literature 1, for example.)

Patent Literature 1: Japanese Patent Laid-Open No. HEI 9-4487

(Gazette)

When a conventional flow rate measuring apparatus is used in an engine fuel injection system of an automotive internal combustion engine, the flow rate measuring apparatus is mounted by screwing the metal base onto an air intake passage of the automotive internal combustion engine. In the case of this air intake passage of the automotive internal combustion engine, ambient temperature is low, and the air intake passage is cold, but the air intake passage itself may also be subjected to the influence of heat from the internal combustion engine and become warm. Since a portion of the metal base constitutes the auxiliary air passage, heat from the air intake passage is conducted through the metal base and transferred to the air flowing through the auxiliary air passage. Thus, air temperature in a vicinity of the heating coils projecting into the auxiliary air passage becomes high, and becomes a factor generating flow rate detection errors.

In conventional flow rate measuring apparatuses, because a heating coil functioning as a flow rate detecting element has a first end connected to the lead frame and is disposed so as to extend inside the auxiliary air passage, misalignments in the relative position of the heating coil and the auxiliary air passage arise easily, and one problem has been that relationships of output relative to flow rate (hereinafter called "flow rate measurement characteristics") becomes irregular among flow rate measuring apparatuses.

SUMMARY OF THE INVENTION

The present invention aims to solve the above problems and an object of the present invention is to provide a flow rate measuring apparatus having reduced irregularities in flow rate measurement characteristics, enabling flow rate to be detected accurately even if a temperature difference arises between internal and external portions of a main passage.

In order to achieve the above object, according to one aspect of the present invention, there is provided a flow rate measuring apparatus including: a measuring passage through which passes a portion of a fluid being measured flowing through a main passage; a flow rate detecting element in which a sensor portion is formed on a front surface of a flat substrate, the flow rate detecting element being disposed such that the sensor portion is exposed inside the measuring passage; a circuit board on which a control circuit is mounted for driving the sensor portion and processing a signal therefrom; and a connector portion for performing sending and receiving of signals between the circuit board and an external portion. The flow rate measuring apparatus further includes: a resin base, the connector portion being formed integrally on the base, the connector portion being positioned outside the main passage and the base projecting inside the main passage; and a metal plate supported by the base, the metal plate being disposed inside the main passage so as to be generally parallel to a direction of flow of the fluid being measured through the main passage. The circuit board is disposed on the metal plate so as to be positioned generally in a common plane with a front surface of the metal plate, the flow rate detecting element is positioned generally in a common plane with the front surface of the metal plate and disposed on the metal plate in close proximity to an opposite end of the circuit board from the connector portion, a circuit housing portion is disposed on the front surface of the metal plate so as to surround the circuit board, an electrical connection portion between the circuit board and the flow rate detecting element, and an electrical connection portion between the circuit board and the connector portion, a cover is mounted so as to cover the circuit housing portion, and a measuring passage groove forming portion is disposed on a front surface of the metal plate at an opposite end of the circuit housing portion from the connector and functions together with the metal plate to constitute the measuring passage. Ion addition, the circuit housing portion and the measuring passage groove forming portion are formed integrally on the base.

According to the present invention, because a rear surface of the metal plate is exposed inside the main passage and a portion of the front surface of the metal plate is exposed inside the measuring passage, the metal plate is easily acclimatized to the temperature of the fluid being measured. Thus, the temperature of the fluid being measured is easily conducted to the flow rate detecting element. Because the metal plate is positioned in the main passage, the temperature of the main passage is less likely to be conducted to the flow rate detecting element through the metal plate. Thus, even if there is a temperature difference between internal and external portions of the main passage, the temperature of the flow rate detecting element easily follows the temperature of the fluid being measured, making accurate flow rate detection possible.

The flow rate detecting element is disposed so as to be positioned generally in a common plane with a front surface of the metal plate by being housed in and fixed to a flow rate detecting element housing recess portion of the metal plate. Thus, by forming the flow rate detecting element housing recess portion based on the external shape of the metal plate, and mounting the base to the metal plate based on the external shape of the metal plate, misalignments in the relative positions between the flow rate detecting element and the measuring passage are less likely to arise among flow rate measuring apparatuses. Thus, irregularities in flow rate measurement characteristics among flow rate measuring apparatuses can be suppressed.

DETAILED DESCRIPTION OF THE PREFERRED EMBODIMENTS

Preferred embodiments of the present invention will now be explained with reference to the drawings.

Embodiment 1

Figure 1:
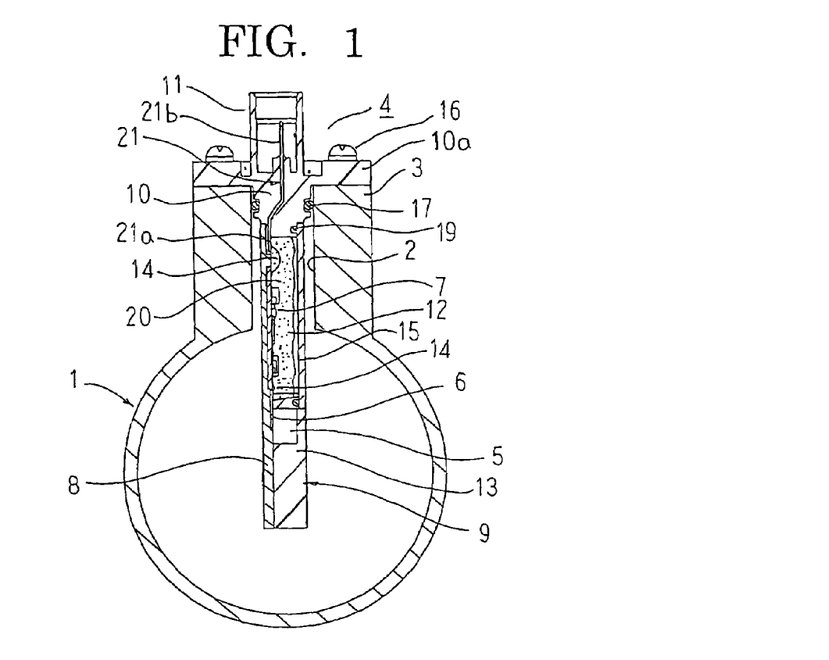
FIG. 1 is a lateral cross section showing a state in which a flow rate measuring apparatus according to Embodiment 1 of the present invention is mounted to a main passage.
Figure 2:
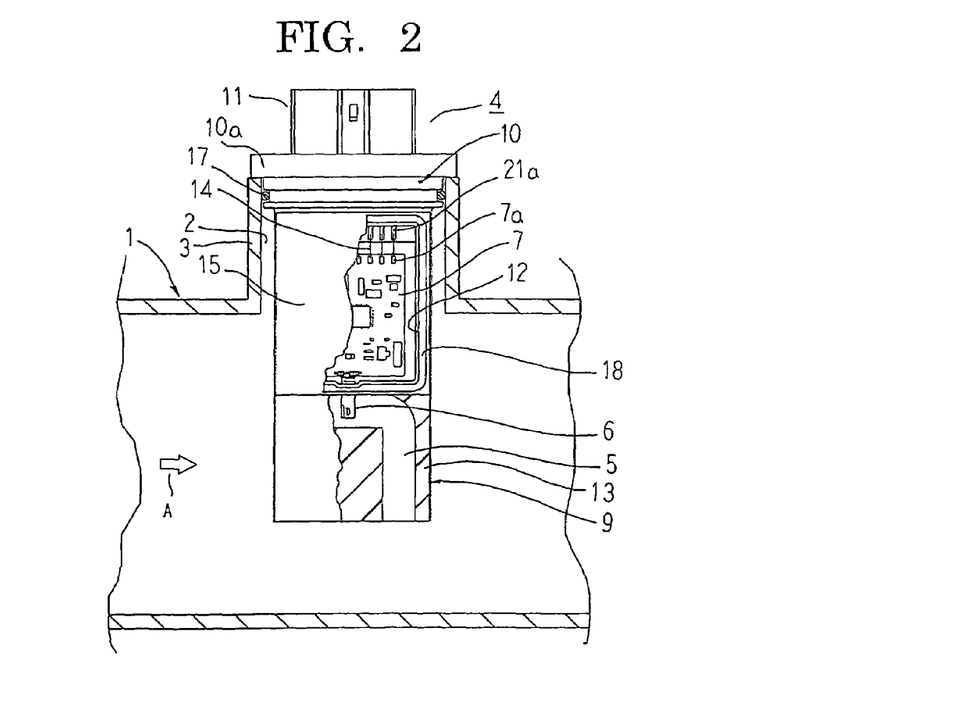
FIG. 2 is a longitudinal section showing a state in which the flow rate measuring apparatus according to Embodiment 1 of the present invention is mounted to the main passage.
Figure 3:
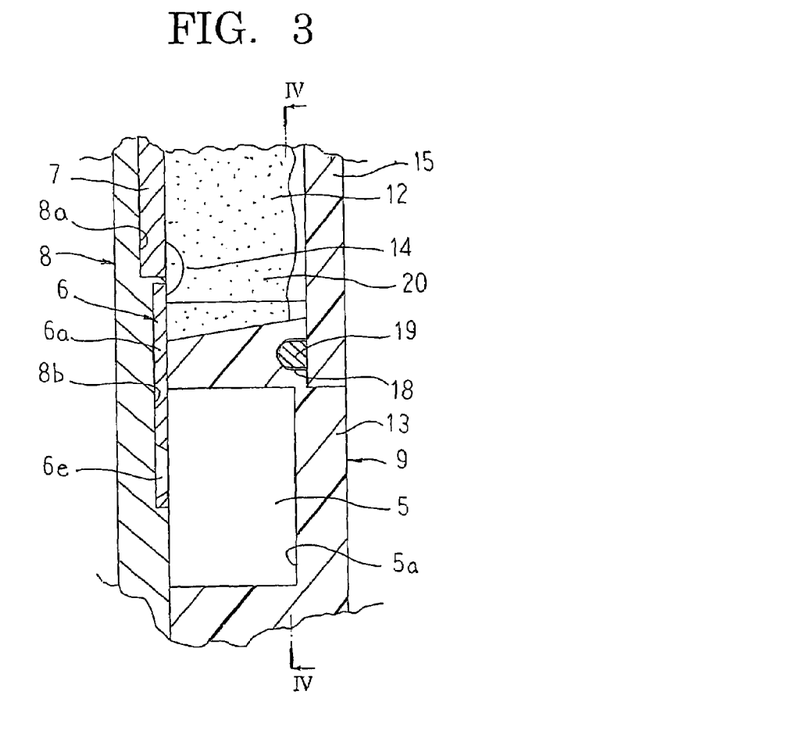
FIG. 3 is an enlargement of part of FIG. 1.
Figure 4:
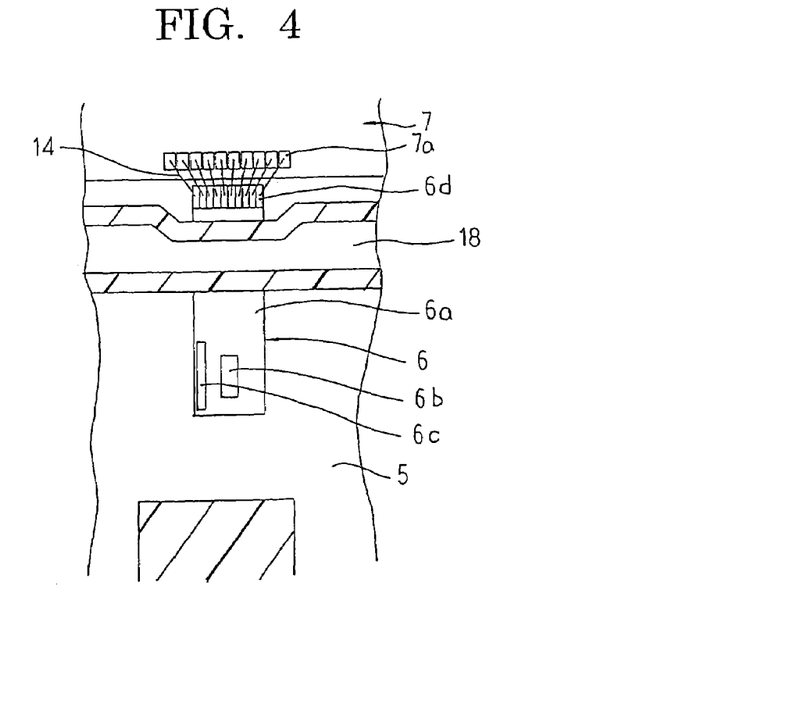
FIG. 4 is a cross section taken along line IV-IV in FIG. 3 viewed from the direction of the arrows.

FIG. 1 is a lateral cross section showing a state in which a flow rate measuring apparatus according to Embodiment 1 of the present invention is mounted to a main passage, FIG. 2 is a longitudinal section showing a state in which the flow rate measuring apparatus according to Embodiment 1 of the present invention is mounted to the main passage, FIG. 3 is an enlargement of part of FIG. 1, and FIG. 4 is a cross section taken along line IV-IV in FIG. 3 viewed from the direction of the arrows. Moreover, the lateral section shows surfaces of a cross section perpendicular to a central axis of a main passage, and the longitudinal section show surfaces of a cross section along the central axis of the main passage. In FIG. 2, a partially cut-away cross section is shown to facilitate explanation. A sealing gel is also omitted from FIGS. 2 and 4 to facilitate explanation.

In FIGS. 1 through 4, a main passage 1 is a cylindrical pipe body through which a fluid being measured flows, and in the case of an automotive internal combustion engine is normally made of a resin and configured integrally with an intake air filtration apparatus. An insertion aperture 2 for plugging in a flow rate measuring apparatus 4 is disposed in the main passage 1.

The flow rate measuring apparatus 4 includes: a measuring passage 5 disposed inside the main passage 1, a portion of the fluid being measured flowing through the measuring passage 5; a flow rate detecting element 6 for detecting a flow rate of the fluid being measured flowing through the measuring passage 5; a circuit board 7 on which a control circuit for driving the flow rate detecting element 6 and processing a flow rate detection signal therefrom is configured; a metal plate 8 for holding the flow rate detecting element 6 and the circuit board 7; and a base 9 for supporting the metal plate 8.

The flow rate detecting element 6 is configured by forming a sensor portion constituted by a flow rate detecting resistor 6b and a temperature compensating resistor 6c on a front surface of a flat, rectangular substrate 6a, and forming input and output terminals 6d electrically connected to the flow rate detecting resistor 6b and the temperature compensating resistor 6c at a first end of the front surface of the substrate 6a. Here, the flow rate detecting resistor 6b, the temperature compensating resistor 6c, and the input and output terminals 6d are formed by patterning a thermosensitive resistor film of platinum, nickel, iron-nickel alloy, etc., formed on the front surface of the substrate 6a. Furthermore, a region of formation of the flow rate detecting resistor 6b and the temperature compensating resistor 6c is formed into a diaphragm construction by removing the substrate 6a from a rear surface to form a cavity 6e. In addition, a heat insulating means (not shown) for making heat from the flow rate detecting resistor 6b less likely to transfer to the temperature compensating resistor 6c is applied to the flow rate detecting element 6. Furthermore, an electrically-insulating material such as silicon or a ceramic, etc., can be used for the material of the substrate 6a.

The metal plate 8 is made by shaping a metal material such as aluminum, or a stainless alloy, etc., into a flat, rectangular shape, and a circuit board housing recess portion 8a and a flow rate detecting element housing recess portion 8b are recessed in close proximity on a front surface thereof. The circuit board 7 is housed in the circuit board housing recess portion 8a and fixed with an adhesive. The flow rate detecting element 6 is housed inside the flow rate detecting element housing recess portion 8b with the input and output terminals 6d positioned near the circuit board 7 and fixed using an adhesive. Moreover, the circuit board 7 and the flow rate detecting element 6 are positioned in a common plane with a front surface of the metal plate 8.

The base 9 includes: a joint portion 10 for ensuring airtightness when the base 9 is inserted into the main passage 1; a connector portion 11 disposed on a first side of the joint portion 10, the connector portion 11 sending and receiving signals between the circuit board 7 and an external portion; a circuit housing portion 12 disposed on a second side of the joint portion 10, the circuit housing portion 12 enveloping the circuit board housing recess portion 8a and an end of the flow rate detecting element housing recess portion 8b near the circuit board housing recess portion 8a; and a measuring passage groove forming portion 13 formed at a second end of the circuit housing portion 12, and the base 9 is molded integrally, for example, using a resin such as polybutylene terephthalate, etc. Moreover, a measuring passage groove 5a constituting the measuring passage 5 is recessed into a first surface of the measuring passage groove forming portion 13.

The metal plate 8 is fixed to the base 9 using an adhesive with the circuit board 7 and the flow rate detecting element 6 mounted such that the circuit board 7 and the end of the flow rate detecting element 6 having the input and output terminals 6d are exposed inside the circuit housing portion 12. A rear surface of the metal plate 8 is exposed through the base 9. A portion of a front wall surface of the metal plate 8 functions together with the measuring passage groove forming portion 13 of the base 9 to constitute the measuring passage 5. Specifically, an opening of the measuring passage groove 5a is blocked by the metal plate 8 to constitute the measuring passage 5. In addition, the region of formation of the flow rate detecting resistor 6b and the temperature compensating resistor 6c on the flow rate detecting element 6 is exposed inside the measuring passage 5. A plurality of insert conductors 21 are insert-molded into the base 9 such that a first end 21a of each is exposed inside the circuit housing portion 12 and a second end 21b of each is exposed inside the connector portion 11.

The input and output terminals 6d of the flow rate detecting element 6 and the electrode terminals 7a of the circuit board 7 are wire-bonded using wires 14, and the electrode terminals 7a of the circuit board 7 and the first ends 21a of the insert conductors 21 are wire-bonded using wires 14. Moreover, wire bonding has been explained as an example of an electrical connection technique, but electrical connection methods such as welding, soldering, etc., may also be used.

In addition, a resin cover 15 is affixed so as to cover the circuit housing portion 12 using an adhesive 19 applied to outer peripheral grooves 18 of the circuit housing portion 12. Here, the circuit housing portion 12 is charged with a sealing gel 20.

In a flow rate measuring apparatus 4 configured in this manner, a main body portion positioned on the second side of the joint portion 10 constituted by a projecting portion of the base 9, the metal plate 8, and the cover 15 is formed into a rectangular parallelepiped having a cross section that is a rectangular shape perpendicular to its direction of projection. The main body portion is contained inside an outline of the joint portion 10 when viewed from the direction of projection. One of two wall surfaces constituted by long sides of the rectangular cross section of the main body portion is constituted by a rear surface of the metal plate 8. In addition, an inflow aperture of the measuring passage 5 is formed in a first of two wall surfaces constituted by short sides of the rectangular cross section of the main body portion, and an outflow aperture of the measuring passage 5 is formed on a leading end surface of the main body portion in the direction of projection.

This flow rate measuring apparatus 4 is mounted by inserting the main body portion into the insertion aperture 2 so as to project inside the main passage 1, and securely fastening a flange portion 10a of the joint portion 10 to the flange portion 3 of the main passage 1 using screws 16. This flow rate measuring apparatus 4 is plugged into the main passage 1 such that the wall surfaces constituted by the long sides of the rectangular cross section of the main body portion are generally parallel to a direction of flow A of the measured fluid flowing through the main passage 1, and also such that the first wall surface constituted by the short side of the rectangular cross section of the main body portion is positioned upstream. An O ring 17 is interposed between the joint portion 10 and the insertion aperture 2 to ensure airtightness.

External electric power is supplied from the connector portion 11 through the insert conductors 21 to the control circuit configured on the circuit board 7. This control circuit controls an excitation current flowing to the flow rate detecting resistor 6b, for example, such that the flow rate detecting resistor 6b is maintained in such a way as to have a temperature that is higher than the temperature of the fluid being measured detected at the temperature compensating resistor 6c by a predetermined temperature. The fluid being measured flowing through the main passage 1 flows into the measuring passage 5, and flows over the front surface of the flow rate detecting element 6.

At that time, if the flow rate of the fluid being measured is large, the quantity of heat transferred from the flow rate detecting resistor 6b to the fluid being measured increases, reducing the temperature of the flow rate detecting resistor 6b. Then, the control circuit increases the quantity of electric current passed to the flow rate detecting resistor 6b so as to compensate for the quantity of heat transferred to the fluid being measured such that the flow rate detecting resistor 6b is maintained in such a way as to have the temperature that is higher than the temperature of the fluid being measured by the predetermined temperature. Conversely, if the flow rate of the fluid being measured decreases, the quantity of heat transferred from the flow rate detecting resistor 6b to the fluid being measured is reduced, and the temperature of the flow rate detecting resistor 6b rises. Then, the control circuit decreases the quantity of electric current passed to the flow rate detecting resistor 6b such that the flow rate detecting resistor 6b is maintained in such a way as to have the temperature that is higher than the temperature of the fluid being measured by the predetermined temperature.

Thus, the flow rate of the fluid being measured flowing through the measuring passage 5, which has a predetermined passage cross-sectional area, is detected by detecting the value of the excitation current flowing to the flow rate detecting resistor 6b and outputting it as a flow rate signal for the fluid being measured. The flow velocity of the fluid being measured can also be similarly detected.

If the main passage 1 is an air intake passage of an automotive internal combustion engine, for example, ambient temperature is low, and the intake air in the main passage 1 is cold, but the main passage 1 itself may also be subjected to the influence of heat from the internal combustion engine and become warm.

If the present flow rate measuring apparatus 4 is used in an air intake passage (main passage 1) of a automotive internal combustion engine of that kind, because the flow rate detecting element 6 and the circuit board 7 are disposed on the front surface of the metal plate 8, and the rear surface of the metal plate 8 is exposed inside the main passage 1, and a portion of the front surface of the metal plate 8 is exposed inside the measuring passage 5, the metal plate 8 is easily acclimatized to the temperature of the fluid being measured. Thus, the temperature of the fluid being measured is easily transferred to the flow rate detecting element 6. Because the metal plate 8 is positioned in the main passage 1, and the metal plate 8 does not project outside the main passage 1, and also does not contact the main passage 1 directly, the temperature of the main passage 1 is less likely to be conducted to the flow rate detecting element 6 through the metal plate 8. Thus, even if there is a temperature difference between internal and external portions of the main passage 1, the temperature of the flow rate detecting element 6 can easily follow the temperature of the fluid being measured, making accurate flow rate detection possible.

The flow rate detecting element 6, is disposed on a mechanically very strong metal plate 8. Thus, even if a mechanically weak silicon substrate is used for the substrate 6a of the flow rate detecting element 6, rigidity of the flow rate detecting element 6 can be ensured. In addition, because age-related deterioration of the metal plate 8 is very small compared to resins, age-related changes in the mounted position of the flow rate detecting element 6 are reduced, enabling reductions in age-related changes in the flow rate measurement characteristics of the flow rate measuring apparatus 4.

Because the highly-rigid metal plate 8 is present under the connecting portion, ultrasonic waves can applied to the connecting portion efficiently when applying wire bonding without being dispersed. Thus, the wires 14 and the input and output terminals 6d of the flow rate detecting element 6, and the wires 14 and the electrode terminals 7a of the circuit board 7 can be reliably electrically connected, and highly-reliable electrical connection becomes possible.

Because the flow rate detecting element 6 is disposed so as to be positioned in a common plane with the metal plate 8, turbulence does not arise in the fluid being measured at boundaries between the metal plate 8 and the flow rate detecting element 6, making accurate flow rate detection possible.

The flow rate detecting element 6 is housed in and fixed to a flow rate detecting element housing recess portion 8b on the metal plate 8. Thus, by forming the flow rate detecting element housing recess portion 8b based on the external shape of the metal plate 8, and mounting the base 9 to the metal plate 8 based on the external shape of the metal plate 8, misalignments in the relative positions between the flow rate detecting element 6 and the measuring passage 5 are less likely to arise among flow rate measuring apparatuses 4. Thus, irregularities in flow rate measurement characteristics among flow rate measuring apparatuses 4 can be suppressed.

A method for manufacturing a flow rate measuring apparatus 4 will now be explained with reference to FIGS. 5 through 8.

First, a metal plate sheet 27 is prepared. The metal plate sheet 27 is produced as a rectangular flat plate having a size on which five metal plates 8 can be produced, using aluminum, for example. Circuit boards 7, flow rate detecting elements 6, covers 15, and bases 9 are also prepared.

Figure 5:
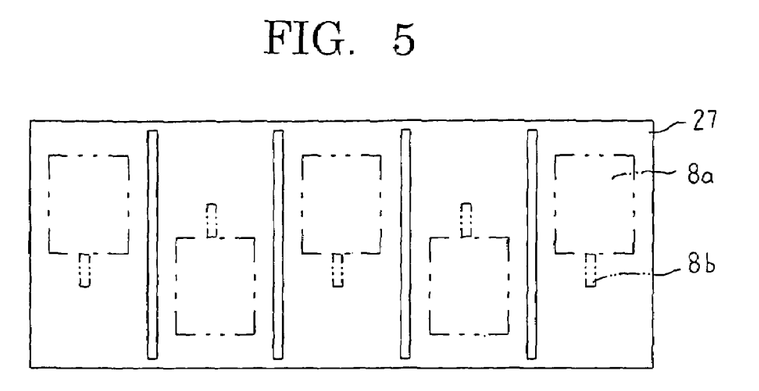
FIG. 5 is a process diagram explaining a method for manufacturing the flow rate measuring apparatus according to Embodiment 1 of the present invention.

Then, as shown in FIG. 5, circuit board housing recess portions 8a and flow rate detecting element housing recess portions 8b are recessed into a first surface of the metal plate sheet 27 using a method such as pressing, etc.

Figure 6:
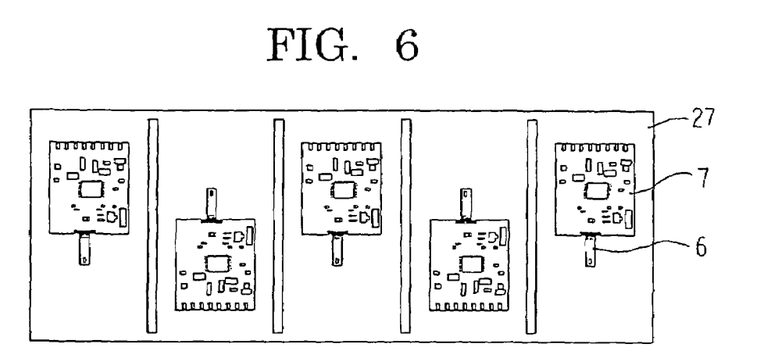
FIG. 6 is a process diagram explaining the method for manufacturing the flow rate measuring apparatus according to Embodiment 1 of the present invention.

Next, an adhesive is applied to the circuit board housing recess portions 8a and the flow rate detecting element housing recess portions 8b. Thereafter, as shown in FIG. 6, the circuit boards 7 and the flow rate detecting elements 6 are inserted into the circuit board housing recess portions 8a and the flow rate detecting element housing recess portions 8b, and fixed by hardening the adhesive.

Next, the circuit boards 7 and the flow rate detecting elements 6 are connected electrically by wire bonding. In this state, circuit adjustment is applied for matching between the circuit boards 7 and the flow rate detecting elements 6.

Figure 7:
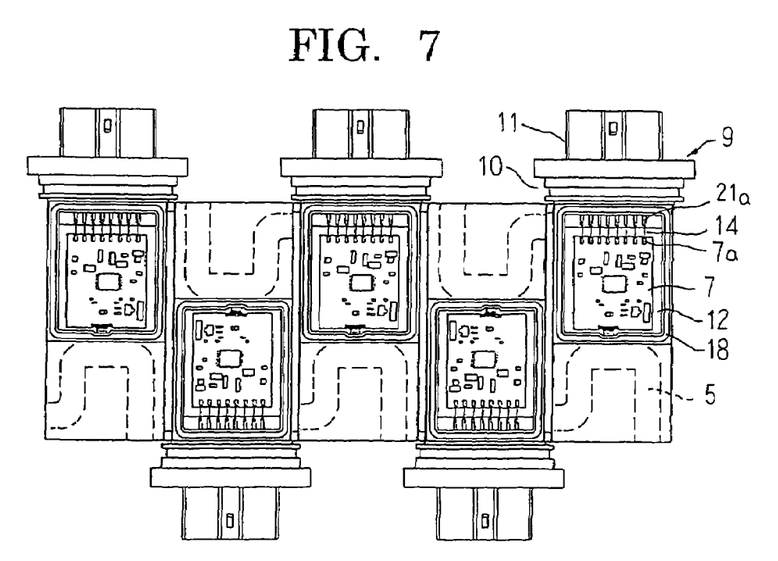
FIG. 7 is a process diagram explaining the method for manufacturing the flow rate measuring apparatus according to Embodiment 1 of the present invention.
Figure 8:
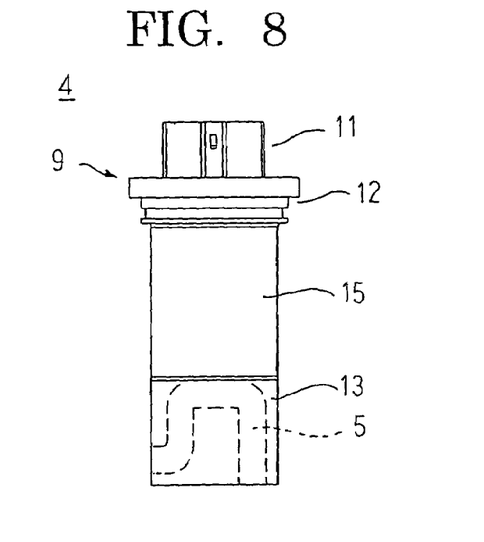
FIG. 8 is a process diagram explaining the method for manufacturing the flow rate measuring apparatus according to Embodiment 1 of the present invention.

Next, an adhesive is applied to predetermined positions on the metal plate sheet 27, and the bases 9 are mounted to the metal plate sheet 27 and fixed by hardening the adhesive. Thereafter, the circuit boards 7 and first ends 21 a of the insert conductors 21 are connected electrically by wire bonding. That state is shown in FIG. 7.

Next, the circuit housing portion 12 is charged with a sealing gel 20 constituted by a gel agent such as a silicone resin, a fluorine resin., etc. Then, an adhesive 19 is applied to the outer peripheral grooves 18, and the covers 15 are mounted so as to cover the circuit housing portions 12. Thereafter, the adhesive 19 is hardened, and the metal plate sheet 27 is cut by pressing, etc., to obtain flow rate measuring apparatuses 4 such as that shown in FIG. 8.

Thus, using this manufacturing method, because positioning during parts assembly can be made based on the external shape of the metal plate sheet 27 in each of the processes, for example, positioning accuracy for each of component parts is easily ensured. Because the flow rate measuring apparatuses 4 are assembled by mounting component parts sequentially onto the metal plate sheet 27, the process is simplified, enabling many flow rate measuring apparatuses 4 to be manufactured in a single process. Thus, rationalization of the manufacturing process is enabled, suppressing irregularities in individual flow rate measuring apparatuses 4, and enabling manufacturing costs to be reduced.

Embodiment 2

Figure 9:
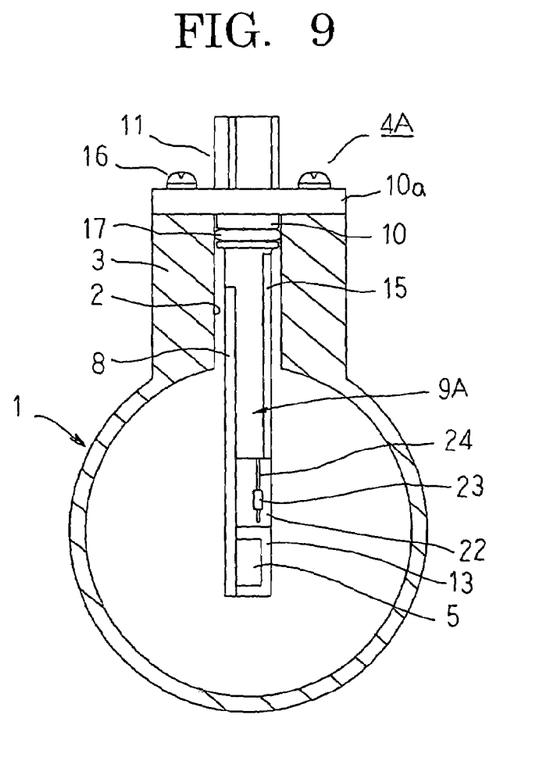
FIG. 9 is a front elevation showing a state in which a flow rate measuring apparatus according to Embodiment 2 of the present invention is mounted to a main passage viewed from an upstream end.
Figure 10:
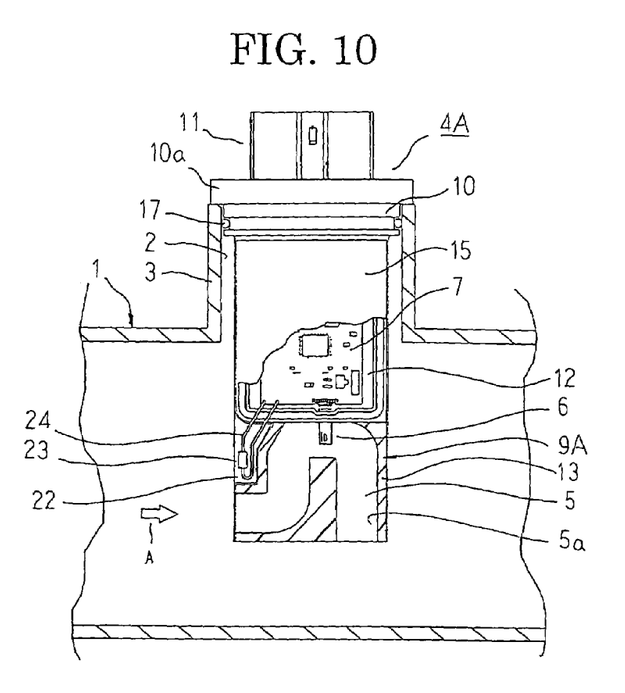
FIG. 10 is a longitudinal section showing a state in which the flow rate measuring apparatus according to Embodiment 2 of the present invention is mounted to the main passage.

FIG. 9 is a front elevation showing a state in which a flow rate measuring apparatus according to Embodiment 2 of the present invention is mounted to a main passage viewed from an upstream end, and FIG. 10 is a longitudinal section showing a state in which the flow rate measuring apparatus according to Embodiment 2 of the present invention is mounted to the main passage. Moreover, in FIG. 10, a partially cut-away cross section is shown and a sealing gel is omitted to facilitate explanation.

In FIGS. 9 and 10, a base 9A includes: an intake air temperature sensor installation portion 22 formed by removing a portion of a measuring passage groove forming portion 13 between an opening of a measuring passage 5 and a circuit housing portion 12. An intake air temperature sensor 23 is installed in the intake air temperature sensor installation portion 22 by electrically connecting leads 24 to electrode terminals of a circuit board 7 directly by soldering. The leads 24 are fixed and sealed between a circuit housing portion 12 and a cover 15 by an adhesive when the cover 15 is mounted.

In a flow rate measuring apparatus 4A configured in this manner, the intake air temperature sensor 23 is positioned inside an outline of the main body portion of the flow rate measuring apparatus 4A when viewed from the direction of flow A of the fluid being measured, and is also positioned inside an outline of the main body portion when viewed from a direction perpendicular to the direction of flow A of the fluid being measured (the direction of projection).

Moreover, the rest of this embodiment is configured in a similar manner to Embodiment 1 above.

In Embodiment 2, because the intake air temperature sensor 23 is installed outside the measuring passage 5 in which the flow rate detecting element 6 is internally mounted, the flow of the fluid being measured in the vicinity of the flow rate detecting element 6 will not be disturbed even if the intake air temperature sensor 23 disturbs the flow of the fluid being measured. Thus, disturbances to output from the flow rate measuring apparatus 4A resulting from the flow of the fluid being measured being disturbed in the vicinity of the flow rate detecting element 6 do not arise, enabling the flow rate to be detected accurately.

The metal plate 8 is positioned in the vicinity of the intake air temperature sensor 23. Thus, even if the temperature of the fluid being measured changes suddenly, the metal plate 8 itself, which has good thermal conductivity, changes along with the temperature of the fluid being measured. Thus, because the temperature of the intake air temperature sensor 23 is also dependent on the temperature of the metal plate 8 and changes along with the temperature of the fluid being measured, the temperature of the fluid being measured can be detected accurately.

Because the intake air temperature sensor 23 is connected to the insert conductors 21 constituting the terminals of the connector portion 11 by means of the leads 24 and the wiring pattern of the circuit board 7, heat from outside the main passage 1 is less likely to be transferred to the intake air temperature sensor 23 through the insert conductors 21, enabling the temperature of the fluid being measured to be detected accurately.

The intake air temperature sensor 23 is positioned inside an outline of the main body portion of the flow rate measuring apparatus 4A when viewed from the direction of flow A of the fluid being measured, and is also positioned inside an outline of the main body portion when viewed from the direction of projection into the main passage 1. Thus, the O ring 17 is prevented preemptively from hooking on the intake air temperature sensor 23 and deforming the intake air temperature sensor 23 when the O ring 17 is mounted to the joint portion 10. The intake air temperature sensor 23 is also prevented preemptively from striking the wall surface of the insertion aperture 2 and being deformed when the flow rate measuring apparatus 4A is plugged into the main passage 1. In addition, because a protective member for protecting the intake air temperature sensor 23 is no longer necessary, the external shape of the flow rate measuring apparatus 4A can be reduced, and reductions in cost are also enabled.

When a flow rate measuring apparatus is mounted to the air intake passage of an automotive internal combustion engine, blowbacks, backfires, etc., due to engine surges act on the flow rate measuring apparatus from a downstream end. However, in this flow rate measuring apparatus 4A, the intake air temperature sensor 23 is not exposed to blowbacks, backfires, etc., due to engine surges from the downstream end, enabling the temperature of the fluid being measured to be detected accurately.

Embodiment 3

Figure 11:
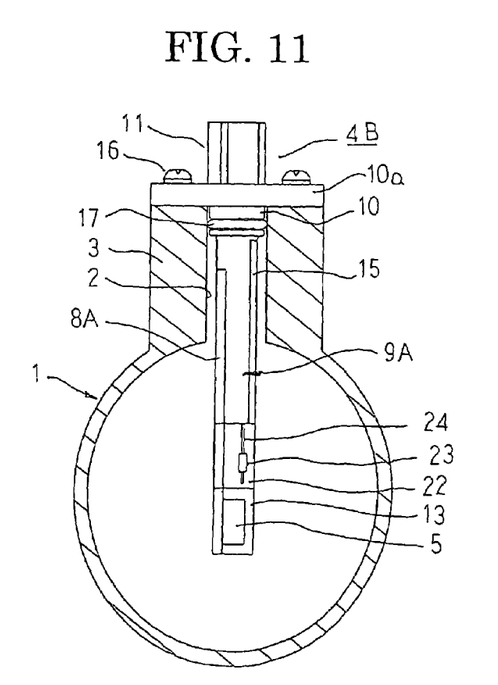
FIG. 11 is a front elevation showing a state in which a flow rate measuring apparatus according to Embodiment 3 of the present invention is mounted to a main passage viewed from an upstream end.
Figure 12:
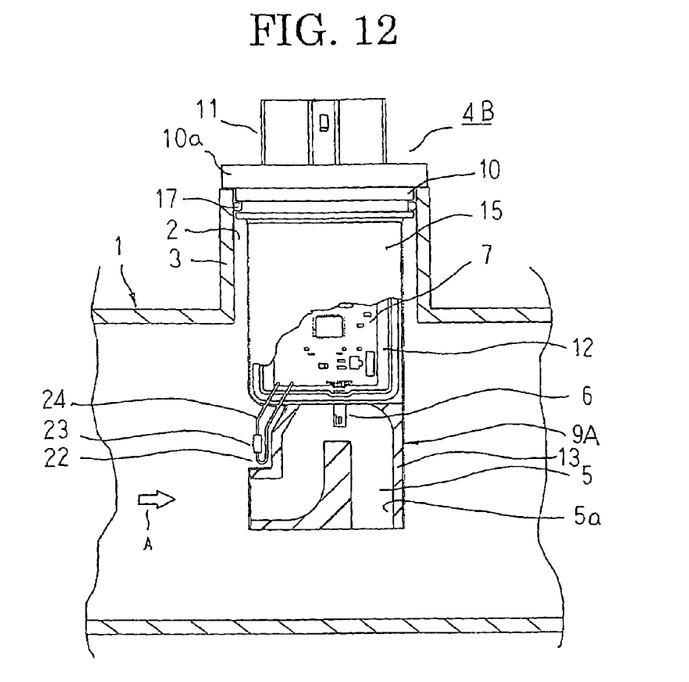
FIG. 12 is a longitudinal section showing a state in which the flow rate measuring apparatus according to Embodiment 3 of the present invention is mounted to the main passage.

FIG. 11 is a front elevation showing a state in which a flow rate measuring apparatus according to Embodiment 3 of the present invention is mounted to a main passage viewed from an upstream end, and FIG. 12 is a longitudinal section showing a state in which the flow rate measuring apparatus according to Embodiment 3 of the present invention is mounted to the main passage. Moreover, in FIG. 12, a partially cut-away cross section is shown and a sealing gel is omitted to facilitate explanation.

In FIGS. 11 and 12, a metal plate 8A is formed such that a region corresponding to where an intake air temperature sensor installation portion 22 is formed on a base 9A is cut away. Moreover, the rest of this embodiment is configured in a similar manner to Embodiment 2 above.

In the flow rate measuring apparatus 4A according to Embodiment 2 above, the direction of flow A of the fluid being measured and a first side in a direction perpendicular to the direction of projection of the main body portion of the intake air temperature sensor installation portion 22 are covered by the metal plate 8. However, in the flow rate measuring apparatus 4B according to Embodiment 3, the direction of flow A of the fluid being measured and the first side in a direction perpendicular to the direction of projection of the main body portion of the intake air temperature sensor installation portion 22 are not covered.

Thus, in this flow rate measuring apparatus 4B, there are no structures obstructing the flow of the fluid being measured upstream from the intake air temperature sensor 23, in the direction of flow A of the fluid being measured, or on first and second sides in a direction perpendicular to the direction of projection of the main body portion. Thus, because the temperature of the intake air temperature sensor 23 promptly follows the temperature changes of the fluid being measured, and the intake air temperature sensor 23 is less likely to be influenced by heat from structures in the vicinity, the temperature of the fluid being measured can be detected more accurately.

Embodiment 4

Figure 13:
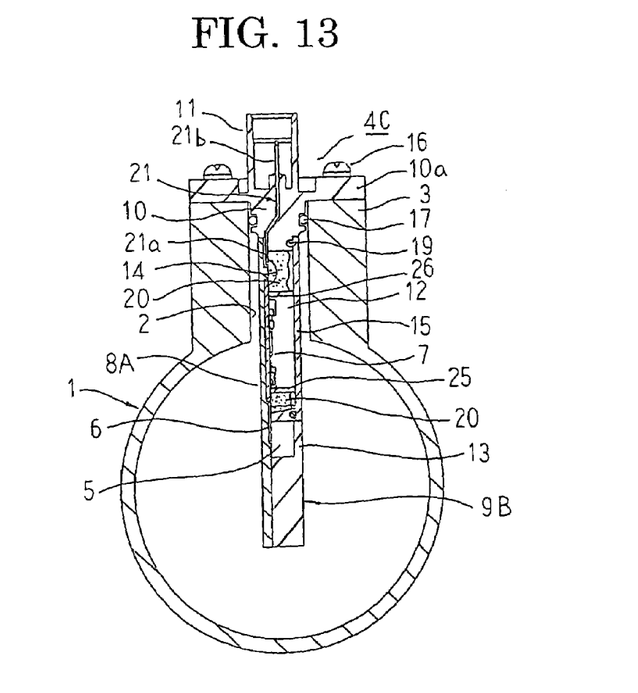
FIG. 13 is a lateral cross section showing a state in which a flow rate measuring apparatus according to Embodiment 4 of the present invention is mounted to a main passage.
Figure 14:
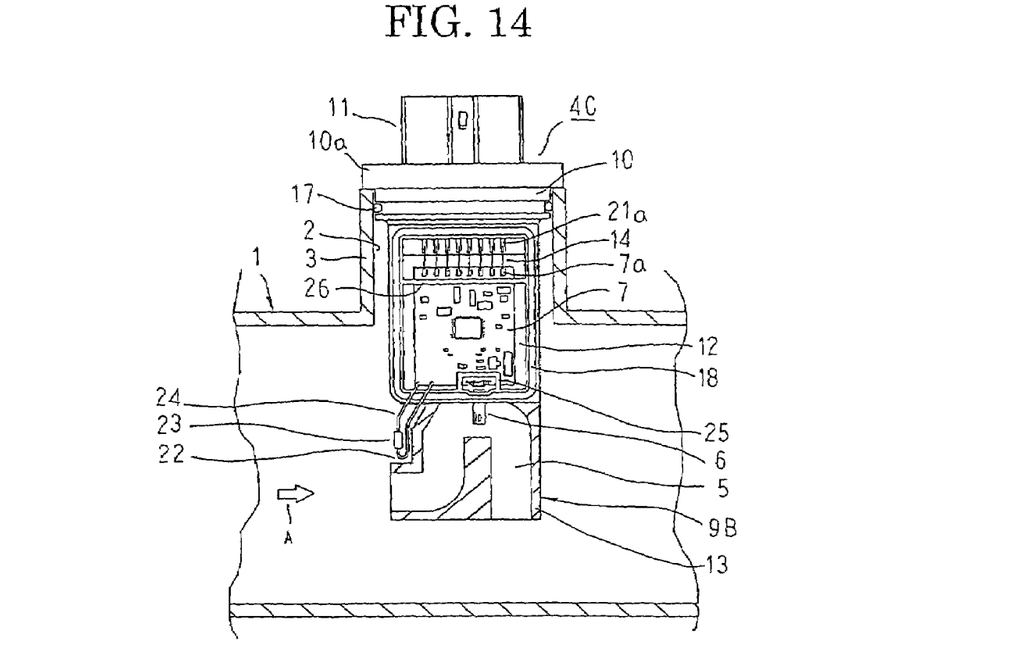
FIG. 14 is a longitudinal section showing a state in which the flow rate measuring apparatus according to Embodiment 4 of the present invention is mounted to the main passage.
Figure 15:
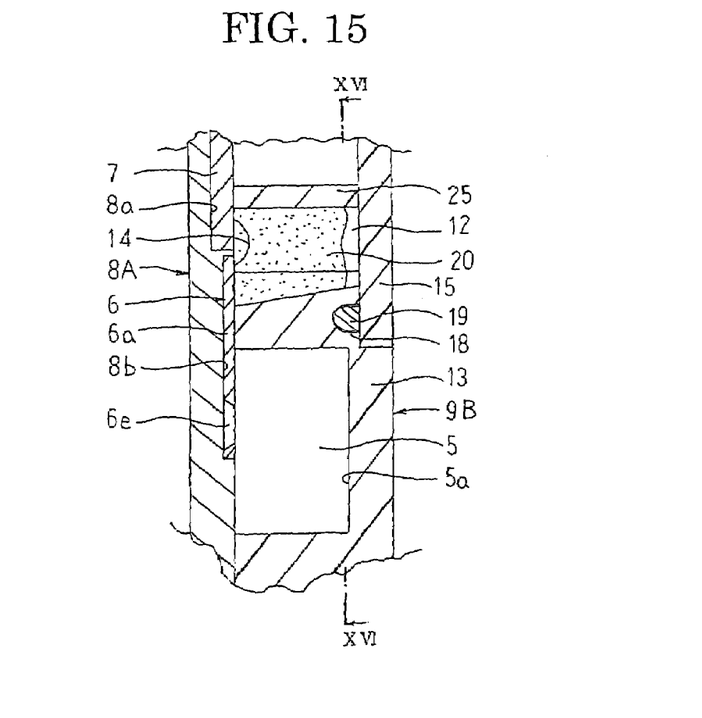
FIG. 15 is an enlargement of part of FIG. 13.
Figure 16:
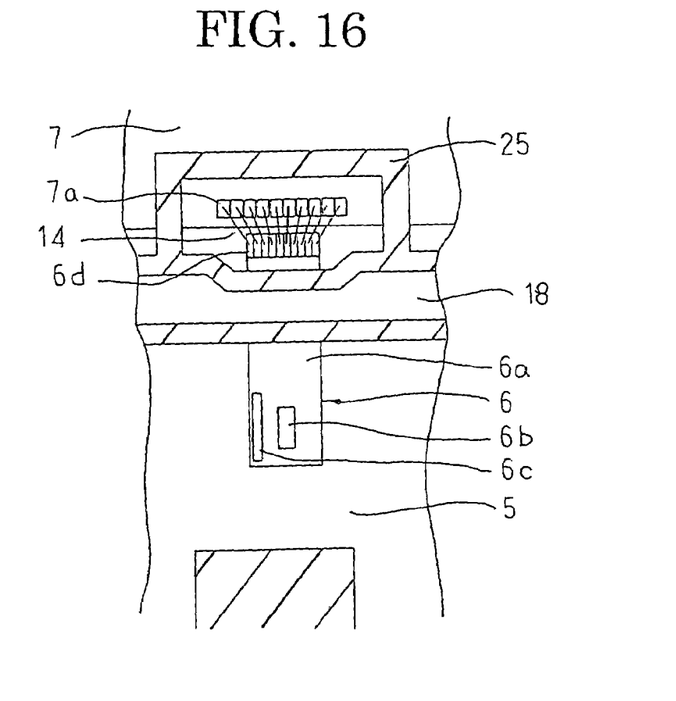
FIG. 16 is a cross section taken along line XVI-XVI in FIG. 15 viewed from the direction of the arrows.

FIG. 13 is a lateral cross section showing a state in which a flow rate measuring apparatus according to Embodiment 4 of the present invention is mounted to a main passage, FIG. 14 is a longitudinal section showing a state in which the flow rate measuring apparatus according to Embodiment 4 of the present invention is mounted to the main passage, FIG. 15 is an enlargement of part of FIG. 13, and FIG. 16 is a cross section taken along line XVI-XVI in FIG. 15 viewed from the direction of the arrows. Moreover, in FIG. 14, a partially cut-away cross section is shown to facilitate explanation. A sealing gel is omitted from FIGS. 14 and 16 to facilitate explanation.

In FIGS. 13 through 16, a first peripheral wall member 25 functioning together with a circuit housing portion 12 to surround an electrical connection portion between a circuit board 7 and a flow rate detecting element 6, and a second peripheral wall member 26 functioning together with the circuit housing portion 12 to surround an electrical connection portion between the circuit board 7 and insert conductors 21 are formed integrally on the circuit housing portion 12 on a base 9B. A space bounded by the circuit housing portion 12 and the first peripheral wall member 25, and a space bounded by the circuit housing portion 12 and the second peripheral wall member 26 are charged with a sealing gel 20. Moreover, the rest of this embodiment is configured in a similar manner to Embodiment 3 above.

In a flow rate measuring apparatus 4C configured in this manner, the electrical connection portion between the circuit board 7 and the flow rate detecting element 6, and the electrical connection portion between the circuit board 7 and the insert conductors 21 are sealed by the sealing gel 20. Thus, it is not necessary to cover the circuit board 7 entirely with the sealing gel 20, enabling the amount of sealing gel 20 used to be kept to a minimum required amount.

Since the volume of sealing gel 20 is small, natural frequencies of the sealing gel 20 can be raised compared to natural frequencies of the sealing gel 20 in Embodiments 1 through 3 above. Because of this, when the flow rate measuring apparatus 4C is subjected to vibration, the sealing gel 20 vibrates at a vibrational mode similar to that of the vibration to which it is being subjected. Because the wires 14 embedded in the sealing gel 20 also vibrate in a similar vibrational mode, excessive stresses do not arise in the wires 14.

Consequently, the wires 14 will not break, nor will the wires 14 separate from the joint portion, thereby providing a highly reliable flow rate measuring apparatus.

Embodiment 5

Figure 17:
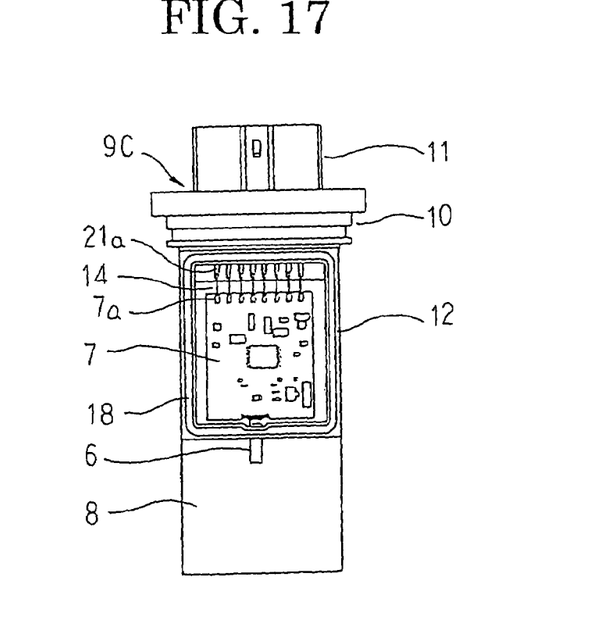
FIG. 17 is a front elevation showing a state before a cover of a flow rate measuring apparatus according to Embodiment 5 of the present invention is mounted.
Figure 18:
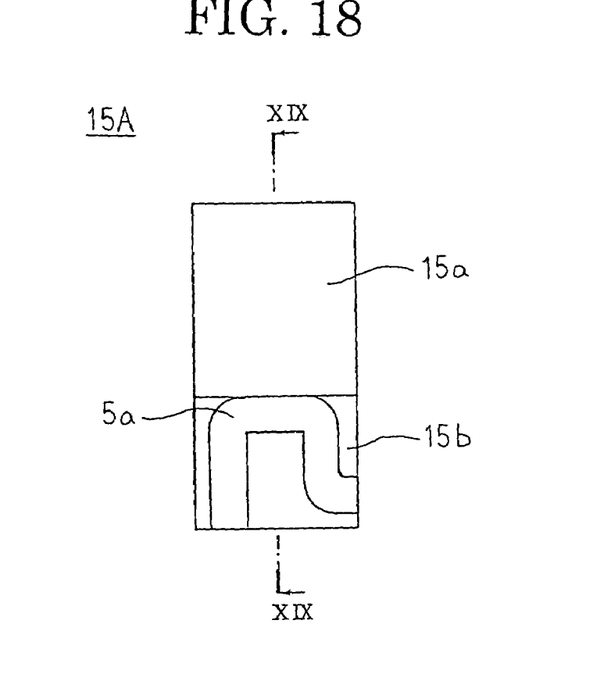
FIG. 18 is a front elevation showing the cover in the flow rate measuring apparatus according to Embodiment 5 of the present invention.
Figure 19:
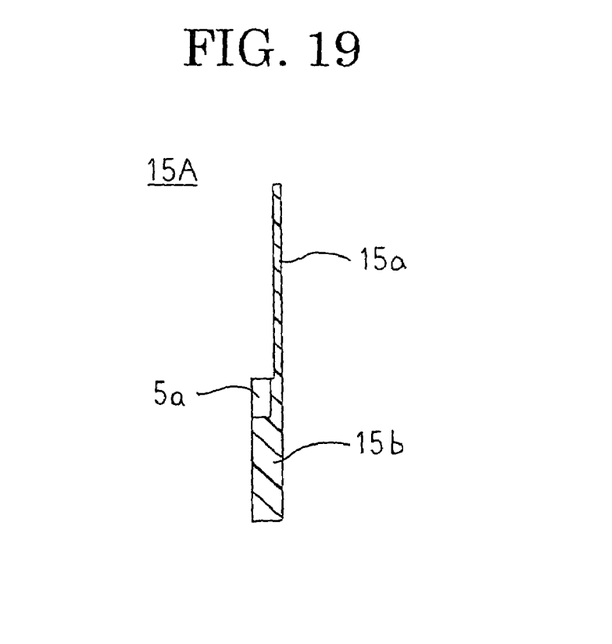
FIG. 19 is a cross section taken along line XIX-XIX in FIG. 18 viewed from the direction of the arrows.

FIG. 17 is a front elevation showing a state before a cover of a flow rate measuring apparatus according to Embodiment 5 of the present invention is mounted, FIG. 18 is a front elevation showing the cover in the flow rate measuring apparatus according to Embodiment 5 of the present invention, and FIG. 19 is a cross section taken along line XIX-XIX in FIG. 18 viewed from the direction of the arrows.

In FIGS. 17 through 19, a base 9C includes: a joint portion 10; a connector portion 11 disposed on a first side of the joint portion 10; and a circuit housing portion 12 disposed on a second side of the joint portion 10, the circuit housing portion 12 enveloping the circuit board housing recess portion 8a and an end of the flow rate detecting element housing recess portion 8b near the circuit board housing recess portion 8a, and the base 9C is molded integrally, for example, using a resin such as polybutylene terephthalate, etc. A cover 15A includes: a cover portion 15a for covering the circuit housing portion 12; and a measuring passage groove forming portion 15b, and is molded integrally, for example, using a resin such as polybutylene terephthalate, etc. A measuring passage groove 5a constituting the measuring passage 5 is recessed into a first surface of the measuring passage groove forming portion 15b.

Moreover, the rest of this embodiment is configured in a similar manner to Embodiment 1 above.

In Embodiment 5, the metal plate 8 is fixed to the base 9C using an adhesive with the circuit board 7 and the flow rate detecting element 6 mounted such that the circuit board 7 and the end of the flow rate detecting element 6 having the input and output terminals 6d are exposed inside the circuit housing portion 12. The input and output terminals 6d of the flow rate detecting element 6 and the electrode terminals 7a of the circuit board 7 are wire-bonded using wires 14, and the electrode terminals 7a of the circuit board 7 and the first ends 21a of the insert conductors 21 are wire-bonded using wires 14. That state is shown in FIG. 14.

The circuit housing portion 12 is then charged with the sealing gel 20, and the adhesive 19 is applied to the outer peripheral grooves 18 of the circuit housing portion 12. Then, a cover 15A having adhesive applied to a front surface of the measuring passage groove forming portion 15b is stacked on the base 9C, and the adhesive is hardened to fix the cover 15A to the base 9C, producing a flow rate measuring apparatus.

In a flow rate measuring apparatus configured in this manner, the measuring passage groove forming portion 15b is fixed to the front surface of the metal plate 8, and the measuring passage 5 is constituted by the measuring passage groove 5a and the front surface of the metal plate 8. The flow rate detecting element 6 projects inside the measuring passage 5.

Consequently, similar effects to those in Embodiment 1 above can also be achieved in Embodiment 5.

It goes without saying that this flow rate measuring apparatus can also be manufactured using the method for manufacturing shown in FIGS. 5 through 8.

Moreover, in Embodiment 5 above, the metal plate 8 and the base 9C are fixed using an adhesive, but the metal plate 8 and the base 9C may also be integrally insert-molded. In that case, because the number of parts is reduced, assembly is improved and manufacturing costs can be reduced. In fact, the metal plate 8 on which the flow rate detecting element 6 is installed and the base 9C may also be integrally insert-molded, and the circuit board 7 mounted to the circuit board housing recess portion 8a thereafter.

The metal plate 8 and the base 9C may also be integrally insert-molded such that a notch is formed in a portion of the circuit housing portion 12 corresponding to the flow rate detecting element housing recess portion 8b, and then the circuit board 7 may be mounted to the circuit board housing recess portion 8a, and the flow rate detecting element 6 mounted to the flow rate detecting element housing recess portion 8b, and then the notch in the circuit housing portion 12 covered by a notch covering part.

What is claimed is:

1. A flow rate measuring apparatus comprising:
    a measuring passage through which passes a portion of a fluid being measured flowing through a main passage;
    a flow rate detecting element in which a sensor portion is formed on a front surface of a flat substrate, said flow rate detecting element being disposed such that said sensor portion is exposed inside said measuring passage;
    a circuit board on which a control circuit is mounted for driving said sensor portion and processing a signal therefrom;
    a connector portion for sending and receiving signals between said circuit board and an external portion;
    a resin base, said connector portion being formed integrally on said base, said connector portion being positioned outside said main passage and said base projecting inside said main passage; and
    a metal plate supported by said base, said metal plate being disposed inside said main passage so as to be substantially parallel to a direction of flow of said fluid being measured through said main passage,
    wherein:
    said circuit board is disposed on said metal plate so as to be positioned substantially in a common plane with a front surface of said metal plate,
    said flow rate detecting element is positioned substantially in a common plane with said front surface of said metal plate and disposed on said metal plate in close proximity to an opposite end of said circuit board from said connector portion,
    a circuit housing portion is disposed on said front surface of said metal plate so as to surround said circuit board, an electrical connection portion between said circuit board and said flow rate detecting element, and an electrical connection portion between said circuit board and said connector portion,
    a cover is mounted so as to cover said circuit housing portion,
    a measuring passage groove forming portion is disposed on a front surface of said metal plate at an opposite end of said circuit housing portion from said connector portion and functions together with said metal plate to constitute said measuring passage, and said circuit housing portion and said measuring passage groove forming portion are formed integrally on said base.

2. The flow rate measuring apparatus according to claim 1, further comprising:
an intake air temperature sensor for measuring a temperature of said fluid being measured, wherein the intake air temperature sensor has leads that are electrically connected directly to said circuit board and is disposed so as to be exposed to said fluid being measured outside said measuring passage, said leads being fixed and sealed between said circuit housing portion and said cover.

3. The flow rate measuring apparatus according to claim 2, wherein:
said intake air temperature sensor is disposed so as to be contained inside an outline of a main body portion constituted by a projecting portion of said base inside said main passage, said metal plate, and said cover when viewed from a direction of flow of said fluid being measured, and inside an outline of said main body portion when viewed from a direction of projection inside said main passage.

4. The flow rate measuring apparatus according to claim 3, wherein:
said intake air temperature sensor is disposed inside an intake air temperature sensor installation portion formed on said main body portion, said intake air temperature sensor installation portion being open from a first side in a direction perpendicular to said direction of projection of said main body portion inside said main passage and perpendicular to said direction of flow said fluid being measured, through an upstream side in said direction of flow of said fluid being measured, to a second side in said direction perpendicular to said direction of projection of said main body portion inside said main passage and perpendicular to said direction of flow of said fluid being measured.

5. The flow rate measuring apparatus according to claim 3, wherein said measuring passage comprises:
an inflow aperture formed in a first of two wall surfaces constituted by short sides of a cross section of the main body portion; and
an outflow aperture formed on a leading end surface of the main body portion in the direction of projection.

6. The flow rate measuring apparatus according to claim 1, wherein:
a first peripheral wall member is formed integrally with said circuit housing portion so as to function together with said circuit housing portion to surround said electrical connection portion between said circuit board and said flow rate detecting element,
a second peripheral wall member is formed integrally with said circuit housing portion so as to function together with said circuit housing portion to surround said electrical connection portion between said circuit board and said connector portion, and
a sealing gel is charged inside a space bounded by said first peripheral wall member and said circuit housing portion and inside a space bounded by said second peripheral wall member and said circuit housing portion.

7. A flow rate measuring apparatus comprising:
a measuring passage through which passes a portion of a fluid being measured flowing through a main passage;
a flow rate detecting element in which a sensor portion is foamed on a front surface of a flat substrate, said flow rate detecting element being disposed such that said sensor portion is exposed inside said measuring passage;
a circuit board on which a control circuit is mounted for driving said sensor portion and processing a signal therefrom; and
a connector portion for sending and receiving signals between said circuit board and an external portion;
a resin base, said connector portion being formed integrally on said base, said connector portion being positioned outside said main passage and said base projecting inside said main passage; and
a metal plate supported by said base, said metal plate being disposed inside said main passage so as to be substantially parallel to a direction of flow of said fluid being measured inside said main passage,
wherein:
said circuit board is disposed on said metal plate so as to be positioned substantially in a common plane with a front surface of said metal plate,
said flow rate detecting element is positioned substantially in a common plane with said front surface of said metal plate and disposed on said metal plate in close proximity to an opposite end of said circuit board from said connector portion,
a circuit housing portion is disposed on said front surface of said metal plate so as to surround said circuit board, an electrical connection portion between said circuit board and said flow rate detecting element, and an electrical connection portion between said circuit board and said connector portion,
a resin cover is mounted so as to cover said circuit housing portion,
a measuring passage groove forming portion is disposed on a front surface of said metal plate at an opposite end of said circuit housing portion from said connector portion and functions together with said metal plate to constitute said measuring passage,
said circuit housing portion is formed integrally on said base, and
said measuring passage groove forming portion is formed integrally on said cover.

8. The flow rate measuring apparatus according to claim 7, wherein: said metal plate is insert-molded integrally together with said base.

9. The flow rate measuring apparatus according to claim 7, further comprising:
an intake air temperature sensor for measuring a temperature of said fluid being measured, wherein the intake air temperature sensor has leads that are electrically connected directly to said circuit board and is disposed so as to be exposed to said fluid being measured outside said measuring passage, said leads being fixed and sealed between said circuit housing portion and said cover.

10. The flow rate measuring apparatus according to claim 9, wherein:
said intake air temperature sensor is disposed so as to be contained inside an outline of a main body portion constituted by a projecting portion of said base inside said main passage, said metal plate, and said cover when viewed from a direction of flow of said fluid being measured, and inside an outline of said main body portion when viewed from a direction of projection inside said main passage.

11. The flow rate measuring apparatus according to claim 10, wherein:

said intake air temperature sensor is disposed inside an intake air temperature sensor installation portion formed on said main body portion, said intake air temperature sensor installation portion being open from a first side in a direction perpendicular to said direction of projection of said main body portion inside said main passage and perpendicular to said direction of flow said fluid being measured, through an upstream side in said direction of flow of said fluid being measured, to a second side in said direction perpendicular to said direction of projection of said main body portion inside said main passage and perpendicular to said direction of flow of said fluid being measured.

12. The flow rate measuring apparatus according to claim 10, wherein said measuring passage comprises:

an inflow aperture formed in a first of two wall surfaces constituted by short sides of a cross section of the main body portion; and an outflow aperture formed on a leading end surface of the main body portion in the direction of projection.

13. The flow rate measuring apparatus according to claim 7, wherein:

a first peripheral wall member is formed integrally with said circuit housing portion so as to function together with said circuit housing portion to surround said electrical connection portion between said circuit board and said flow rate detecting element, a second peripheral wall member is formed integrally with said circuit housing portion so as to function together with said circuit housing portion to surround said electrical connection portion between said circuit board and said connector portion, and a sealing gel is charged inside a space bounded by said first peripheral wall member and said circuit housing portion and inside a space bounded by said second peripheral wall member and said circuit housing portion.

* * * * *